United States Patent Office 3,709,923
Patented Jan. 9, 1973

3,709,923
CONVERSION OF ALDEHYDES TO ESTERS
Paul R. Stapp, Bartlesville, Okla., assignor to
Phillips Petroleum Company
No Drawing. Filed July 13, 1970, Ser. No. 54,655
Int. Cl. C07c 67/00
U.S. Cl. 260—468 R        9 Claims

ABSTRACT OF THE DISCLOSURE

An aldehyde having not more than one hydrogen atom bonded to any carbon atom adjacent to the aldehyde group and wherein the alpha carbon atom, if any, is not olefinically unsaturated, is heated in the presence of a boron containing compound to produce an ester.

This invention relates to conversion of aldehydes to esters. In one of its aspects, it relates to the reaction of aldehydes having no more than one alpha hydrogen atom. In another aspect, it relates to boron compound catalysis.

In one of its concepts this invention provides a method for preparing an ester from an aldehyde in the presence of a boron-containing compound catalyst.

It is therefore an object of this invention to provide an economical and easily accomplished method for producing esters from aldehydes. It is another object of this invention to produce esters which are useful as solvents, plasticizers and the like.

Other aspects, concepts and objects of this invention are apparent from a study of the disclosure and the appended claims.

According to the present invention there is provided a method for reacting aldehydes in the presence of a boron containing compound to produce esters, which method comprises heating in the presence of a boron containing compound an aldehyde having not more than one hydrogen atom on the carbon atom adjacent to the carbonyl group and wherein this alpha carbon atom is not olefinically unsaturated. The conversion of aldehydes to the corresponding esters according to the instant invention can be represented as follows:

$$Y-\overset{O}{\underset{\|}{C}}-H \xrightarrow{\text{B Containing Compound}, \Delta} Y-\overset{O}{\underset{\|}{C}}-O-\overset{H}{\underset{H}{\overset{|}{C}}}-Y$$

wherein Y is one of:

H—, R'—, $R'-\overset{R'}{\underset{R'}{\overset{|}{C}}}-$

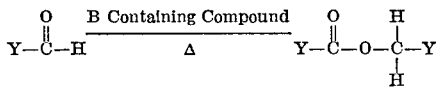

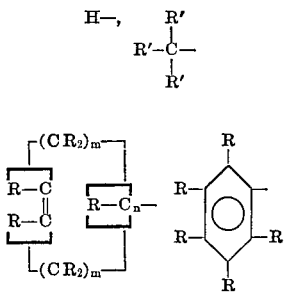

and wherein R is H or alkyl having in the range of 1–3 carbon atoms per R group, but wherein the total number of carbon atoms in all R groups per molecule of aldehyde does not exceed 10; wherein N is 0 or 1; wherein $m$ is an integer in the range of 1–4; and wherein R' is H or alkyl, alkenyl, cycloalkyl, cycloalkenyl, aryl, or combinations thereof having the range of 1–8 carbon atoms per R' group, but wherein at least 2 $R_2'$ groups per molecule of aldehyde are hydrocarbyl.

Any inorganic boron containing compound which also contains oxygen can be employed as a catalyst according to this invention. Examples of boron containing compounds which can be employed in this invention include boric acid, sodium borate, potassium borate, lithium borate, boron oxide, and the like. The boron containing compound can be used alone or it can be supported on a suitable catalyst support such as alumina, silica, titania, zirconia, and the like. Support can comprise as much as 95 weight percent of the total catalytic composition. Any method that assures intimate contact between the catalyst and the aldehyde can be used in this reaction, and sufficient catalyst should be used to provide in the range of 0.001 to 10 grams of boron per 100 grams of aldehyde. The preferred range is 0.01 to 5 grams of boron per 100 grams of aldehyde.

A suitable hydrocarbon diluent can also be employed in amounts which can comprise as much as 99 weight percent of the reaction medium. Examples of such hydrocarbon diluents include cyclohexane, cyclopentane, heptane, octane, toluene, xylene, benzene, and the like.

The process of this invention can be effected at temperatures in the range of 150–300° C. More preferably, temperatures in the range of about 200–275° C. are employed. Pressures in the range of about 0.5 to 20 atmospheres can be employed, often atmospheric pressure is used because of convenience, but pressure should be sufficient to maintain the aldehyde in the liquid phase. A relatively non-reactive gas such as nitrogen, helium, neon, and the like is preferably employed to maintain this pressure. Sufficient reaction time should be employed to effect the degree of conversion desired. Normally, reaction times in the range of 30 seconds to about 48 hours are suitable to effect either a batchwise or continuous reaction according to this invention.

Any of the usual methods can be used for separating the ester produced from the diluent and any unreacted reactants. A solid product can be filtered from the diluent. A liquid can be distilled. In addition to separation a distinct process step of drying the ester can be performed. Although this reaction is usually carried out using only one aldehyde it is within the scope of this invention to employ mixtures of aldehydes to obtain mixed esters.

Examples of suitable aldehydes which can be used according to the process of this invention include:

2-ethylhexanal
formaldehyde
isobutylraldehyde(2-methylpropanal)
3-cyclohexene carboxaldehyde(3-cyclohexenecarbonal)
benzaldehyde (benzenecarbonal)
2,2-dimethylpropanal
2,2-dioctyldecanal
2-octyldecanal
2-(3-octenyl)-decanal
2,2-(2-octenyl)-4-decenal
2-cyclooctyl-2-octenyl-4-decenal
2-(3-cyclooctenyl)decanal
2-benzyldecanal
2,2-diphenyldecanal
2,2-di(2,4-dimethylphenyl)-4-decenal
2-(3-ethylcyclohexyl)-4-decenal
2-cyclohexylethyl-2-(3-hexenyl)decanal
cyclobutanecarbonal
cyclononanecarbonal
6-cycloundecenecarbonal
1,2,3,3,4,8,9,911,11-decamethyl-6-cycloundecene-
    carbonal
1,2,8-tripropyl-6-cycloundecenecarbonal
3-cyclopentenecarbonal
2-methyl-3-cyclopentenecarbonal 3-cyclooctenecarbonal
1-propyl-3-cyclooctenecarbonal
2,3,4,5,6-pentamethylbenzenecarbonal
2,3,4-tripropylbenzenecarbonal
2,4,8-tripropylcyclononanecarbonal and the like.

Examples of esters which can be prepared according to the process of this invention include:

2-ethylhexyl 2-ethylhexanoate
2-methylpropyl 2-methylpropionate
methyl formate
3-cyclohexenylmethyl 3-cyclohexenecarboxylate
benzyl benzoate
2,2-dimethylpropyl 2,2-dimethylpropionate
2,2-dioctyldicyl 2,2-dioctyldecanoate
2-octyldecyl 2-octyldecanoate
2-(3-octenyl)-decyl 2-(3-octenyl)decanoate
2,2-(2-octenyl)-4-decenyl 2,2-(2-octenyl)-4-decenoate
2-cyclooctyl-2-octenyl-4-decenyl 2-cyclooctyl-2-octenyl-4-decenoate
2-(3-cyclooctenyl)decyl 2-(3-cyclooctenyl)decanoate
2-benzyldecyl 2-benzyldecanoate
2,2-diphenyldecyl 2,2-diphenyldecanoate
2,2-di(2,4-dimethylphenyl)-4-decenyl 2,2-di(2,4-dimethylphenyl)-4-decenoate
2-(3-ethylcyclohexyl)-4-decenyl 2-(3-ethylcyclohexyl)-4-decenoate
2-cyclohexylethyl-2-(3-hexenyl)decyl 2-cyclohexylethyl-2-(3-hexenyl)decanoate
cyclobutylmethyl cyclobutanecarboxylate
cyclononylmethyl cyclononanecarboxylate
6-cycloundecenylmethyl 6-cycloundecenecarboxylate
1,2,3,3,4,8,9,9,11,11-decamethyl-6-cycloundecenylmethyl 1,2,3,3,4,8,9,9,11,11-decamethyl-6-cycloundecenecarboxylate
1,2,8-tripropyl-6-cycloundecenylmethyl 1,2,8-tripropyl-6-cycloundecenecarboxylate
3-cyclopentenylmethyl 3-cyclopentenecarboxylate
2-methyl-3-cyclopentenylmethyl 2-methyl-3-cyclopentenecarboxylate
3-cyclooctenylmethyl 3-cyclooctenecarboxylate
1-propyl-3-cyclooctenylmethyl 1-propyl-3-cyclooctenyl-methyl 1-propyl-3-cyclooctenecarboxylate
2,3,4,5,6-pentamethylbenzyl 2,3,4,5,6-pentamethylbenzoate
2,3,4-tripropylbenzyl 2,3,4-tripropylbenzoate
2,4,8-tripropylcyclononylmethyl 2,4,8-tripropylcyclononanecarboxylate and the like.

These esters are well known as solvents, plasticizers, and the like.

The following are specific examples of the preparation of an ester by the process of heating in the presence of a boron containing compound an aldehyde having not more than one hydrogen atom on the carbon atom adjacent to the carbonyl group wherein this carbon atom is not olefinically unsaturated.

EXAMPLE I

A stirred reactor was charged with 180 g. of paraformaldehyde (97 weight percent composition), 20 g. of boric acid, and 250 g. of cyclohexane. The reactor was heated to 250° C. for 5 hours, and allowed to cool. Upon cooling, the reactor was found to contain an organic layer and a water layer. The organic layer was dried over magnesium sulfate and filtered. A distillate comprised of 134 g. of product having a boiling point in the range of 32–35° C. was recovered, and was identified by gas-liquid chromatography and infrared analysis to be methyl formate. This weight of product constituted a yield of 77 mole percent based on the paraformaldehyde charged.

This example demonstrates conversion of paraformaldehyde to methyl formate in the presence of boric acid according to the invention.

EXAMPLE II

A stainless steel reactor was charged with 225 grams of freshly distilled isobutyraldehyde, 200 ml. of heptane and 20 g. of boric acid. The reactor was heated to 250° C. for 8 hours and allowed to cool. The product was filtered from the boric acid, the boric acid was washed with heptane, and the combined wash solution and filtrate was analyzed by gas-liquid chromatography. 119 g. of material identified as isobutyl isobutyrate was produced. This constituted a yield of 72 mole percent based on the isobutyraldehyde charge.

This example demonstrates conversion of isobutyraldehyde to isobutyl isobutyrate at 250° C. in the presence of boric acid and heptane diluent according to the invention.

EXAMPLE III

A stainless steel reactor was charged with 205 g. of freshly distilled isobutyraldehyde, 200 ml. of cyclohexane, and 20 g. of boric acid. The reactor was heated to 200° C. for 5 hours and allowed to cool. The product was filtered from the boric acid, the boric acid was washed with cyclohexane, and the combined wash solution and filtrate was fractionally distilled. Fractions were analyzed by gas-liquid chromatography to determine that a yield of 79 mole percent of isobutyl isobutyrate based on the isobutyraldehyde charged, was recovered.

This example demonstrates that the conversion of Example II is also readily effected at the lower temperature of 200° C., and in the presence of cyclohexane diluent.

EXAMPLE IV

A 1-liter stainless steel reactor was charged with 225 g. of 3-cyclohexene carboxaldehyde, 250 ml. of cyclohexane and 20 g. of boric acid. The autoclave was sealed, flushed with nitrogen, and heated for 7 hours at 250° C. The product was filtered, washed with ether, and distilled to remove the cyclohexane and ether. A product having a boiling point of 117° C. at 0.5 mm. of mercury was further identified by elemental analysis, molecular weight, and nuclear magnetic resonance spectrum to be 3-cyclohexenylmethyl-3-cyclohexenecarboxylate. It was produced in a yield of 60 mole percent based on 3-cyclohexenecarboxaldehyde charge.

This example demonstrates the conversion of 3-cyclohexenecarboxaldehyde to an ester in the presence of boric acid according to the process of the invention.

EXAMPLE V 25 grams of boric acid, 250 grams of benzaldehyde, and 200 milliliters of toluene were charged to a stirred reactor. The reactor was flushed with nitrogen, pressured to 500 p.s.i.g. with nitrogen, and heated at 250° C. for 6.5 hours. Upon cooling the reaction product was stripped of volatiles yielding a residue of 83.5 grams which was dissolved in ether. The ether solution was extracted repeatedly with aqueous $NaCo_3$ solution, dried with $MgSO_4$, filtered and stripped of ether. The oily residue, weighing 68.5 grams was distilled to yield 67 grams of a pure material having a boiling point of 184–186° C. (25 mm. Hg) which was identified as pure benzyl benzoate by infrared analysis.

This example demonstrates the synthesis of benzyl benzoate from benzaldehyde using boric acid catalyst according to this invention.

EXAMPLE VI

A stirred reactor was charged with 250 grams of benzaldehyde, 250 milliliters of toluene, and 25 grams of boric oxide. The reactor was flushed with nitrogen, pressured to 500 p.s.i.g. with nitrogen, and heated for 6 hours at 250° C. Upon cooling the reaction product was filtered and stripped of volatiles. Gas liquid chromatography of the residue determined that 17 mole percent of benzaldehyde had been converted. Conversion of 50 mole percent to benzyl benzoate.

This example demonstrates conversion of benzaldehyde to benzyl benzoate using boric oxide as a catalyst according to this invention.

EXAMPLE VII

A stirred reactor was charged with 25 grams of boric acid, 250 grams of 2-ethylhexanal, and 200 milliliters of toluene. The reactor was flushed with nitrogen, pressured to 500 p.s.i.g. with nitrogen, and heated at 250° C. for 6.5 hours. Upon cooling the reaction product was fractionally distilled to yield 116.2 grams of 2-ethylhexyl 2-ethylhexanoate which constituted a yield of 90 mole percent based on the 2-ethylhexanal converted.

This example demonstrates the conversion of 2-ethylhexanal to 2-ethylhexyl 2-ethylhexanoate according to the invention.

Reasonable variation and modification are possible within the scope of the foregoing disclosure and the appended claims to the invention the essence of which is that boron containing compounds will catalyze the reaction of an aldehyde having not more than one hydrogen atom bonded to any carbon atom adjacent to the aldehyde group wherein this carbon atom is not olefinically unsaturated, to produce an ester.

I claim:

1. A method for preparing an ester from an aldehyde of the formula $$Y-\overset{O}{\overset{\|}{C}}-H$$

wherein Y is one of:

$$H-; \quad R'-\overset{R'}{\underset{R'}{\overset{|}{C}}}-$$

[cyclic structures with $(CR_2)_m$ groups and aromatic ring with R substituents]

and wherein R is H or alkyl having in the range of 1–3 carbon atoms per R group, but wherein the total number of carbon atoms in all R groups per molecule of aldehyde does not exceed 10; wherein $n$ is 0 or 1; wherein $m$ is an integer in the range of 1–4; and wherein R' is H or alkyl, alkenyl, cycloalkyl, cycloalkenyl, aryl, or combinations thereof having in the range of 1–8 carbon atoms per R' group, but wherein at least 2 R' groups per molecule of aldehyde are hydrocarbyl, said method comprising heating the aldehyde in the presence of an inorganic boron and oxygen containing compound and in the presence of a diluent at a temperature and pressure sufficient to maintain the aldehyde in the liquid phase and in a temperature range of 150 to about 300° C. sufficient to produce an ester of the formula $$Y-\overset{O}{\overset{\|}{C}}-O-\overset{H}{\underset{H}{\overset{|}{C}}}-Y$$

wherein Y is defined as above.

2. The method of claim 1 wherein the boron containing compound is employed on a catalyst support.

3. The method of claim 1 wherein said boron and oxygen containing compounds are chosen from the group consisting of boric acid, sodium borate, potassium borate, lithium borate, and boron oxide.

4. Method of claim 3 wherein said aldehyde is paraformaldehyde, said ester is methyl formate, said catalyst is boric acid and said dilute is cyclohexane.

5. Method of claim 3 wherein said aldehyde is isobutyraldehyde, said ester is isobutyl isobutyrate, said catalyst is boric acid and said diluent is heptane.

6. Method of claim 3 wherein said aldehyde is 3-cyclohexene carboxaldehyde, said ester is 3-cyclohexenylmethyl-3-cyclohexenecarboxylate, said catalyst is boric acid and said diluent is cyclohexane.

7. Method of claim 3 wherein said aldehyde is benzaldehyde, said ester is benzylbenzoate, said catalyst is boric acid and said diluent is toluene.

8. Method of claim 7 wherein said catalyst is boric oxide.

9. Method of claim 3 wherein said aldehyde is 2-ethylhexanal, said ester is 2-ethylhexyl 2-ethylhexanoate, said catalyst is boric acid, and said diluent is toluene.

References Cited

UNITED STATES PATENTS 3,081,344   3/1963   Hagemeyer, Jr. et al. __ 260—494

OTHER REFERENCES

Kuivila et al.: J. Am. Chem. Soc. 73, 123 (1951).
Barnes et al.: J. Org. Chem. 23 (561) 1958.
March: Advanced Org. Chem., p. 910 (1968).
Offenhauer et al.: J. Org. Chem. 33, 775 (1968).

LORRAINE A. WEINBERGER, Primary Examiner

R. GERSTL, Assistant Examiner

U.S. Cl. X.R.

260—410, 410.9, 410 S, 469, 476 R, 486 R, 494